(12) United States Patent
Goto

(10) Patent No.: US 7,660,535 B2
(45) Date of Patent: Feb. 9, 2010

(54) OPTICAL TRANSMISSION APPARATUS

(75) Inventor: Ryosuke Goto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 493 days.

(21) Appl. No.: 11/505,357

(22) Filed: Aug. 17, 2006

(65) Prior Publication Data
US 2007/0223924 A1 Sep. 27, 2007

(30) Foreign Application Priority Data
Mar. 27, 2006 (JP) ............................. 2006-085226

(51) Int. Cl.
*H04B 10/04* (2006.01)
(52) U.S. Cl. ................... 398/186; 398/189; 398/190; 398/191; 398/79
(58) Field of Classification Search .............. 398/186, 398/182, 183, 153, 79, 189, 190, 191
See application file for complete search history.

(56) References Cited

U.S. PATENT DOCUMENTS 5,317,577 A * 5/1994 Urakami et al. ............... 372/21
5,963,567 A * 10/1999 Veselka et al. ................ 372/21
2003/0012295 A1 * 1/2003 Matsumoto et al. ......... 375/295
2004/0109695 A1 * 6/2004 Watanabe .................... 398/186
2006/0051100 A1 * 3/2006 Watanabe .................... 398/152

FOREIGN PATENT DOCUMENTS

| JP | 07-312575 | 11/1995 |
| JP | 08-234250 | 9/1996 |
| JP | 09-244076 | 9/1997 |
| JP | 2001-264830 | 9/2001 |
| JP | 2003-018126 | 1/2003 |
| JP | 2003-069502 | 3/2003 |

* cited by examiner

*Primary Examiner*—Ken N Vanderpuye
*Assistant Examiner*—Hibret A Woldekidan
(74) *Attorney, Agent, or Firm*—Staas & Halsey LLP

(57) ABSTRACT

Before being incident to a nonlinear medium, a short pulse is intensity-modulated with a bit string pattern, and then made incident. When the pulse light corresponding to a bit value '0' is incident to the nonlinear medium, the pulse light is intensity-modulated so that the spectral width thereof is not spread to a predetermined spectral region due to the nonlinear phenomena, thereby producing a light state of being not output from an optical demultiplexer. Meanwhile, when the pulse light corresponding to a bit value '1' is incident to the nonlinear medium, the pulse light is intensity-modulated so that the spectral width thereof is spread to the predetermined spectral region due to the nonlinear phenomena, thereby producing a light state of being output from the optical demultiplexer.

9 Claims, 14 Drawing Sheets

OUTPUT OF SHORT PULSE LIGHT SOURCE 11

OUTPUT OF NONLINEAR MEDIUM 12

OUTPUT OF OPTICAL INTENSITY MODULATOR 2

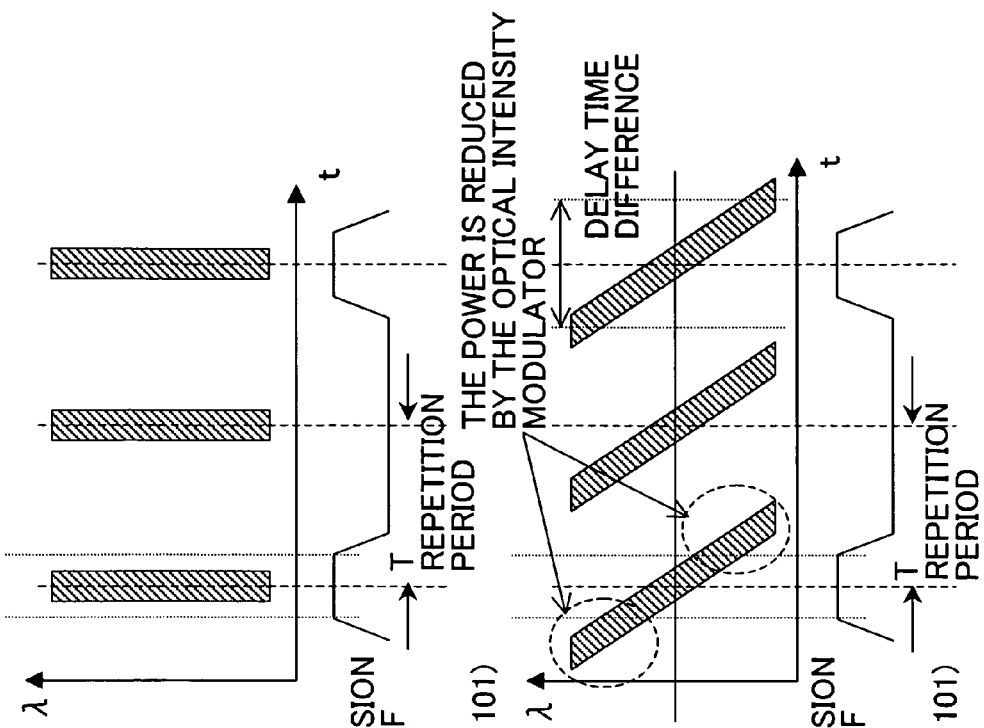
FIG. 7A
FIG. 7B
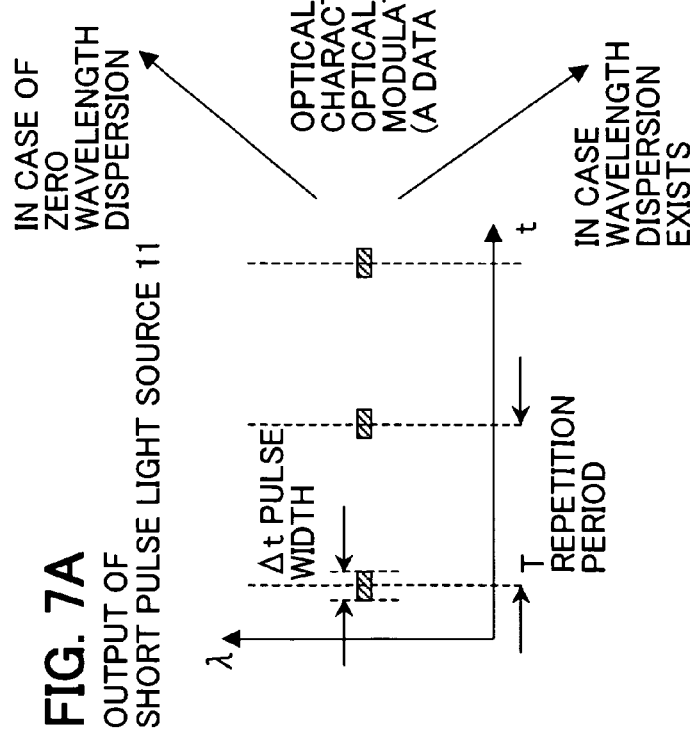
FIG. 7C

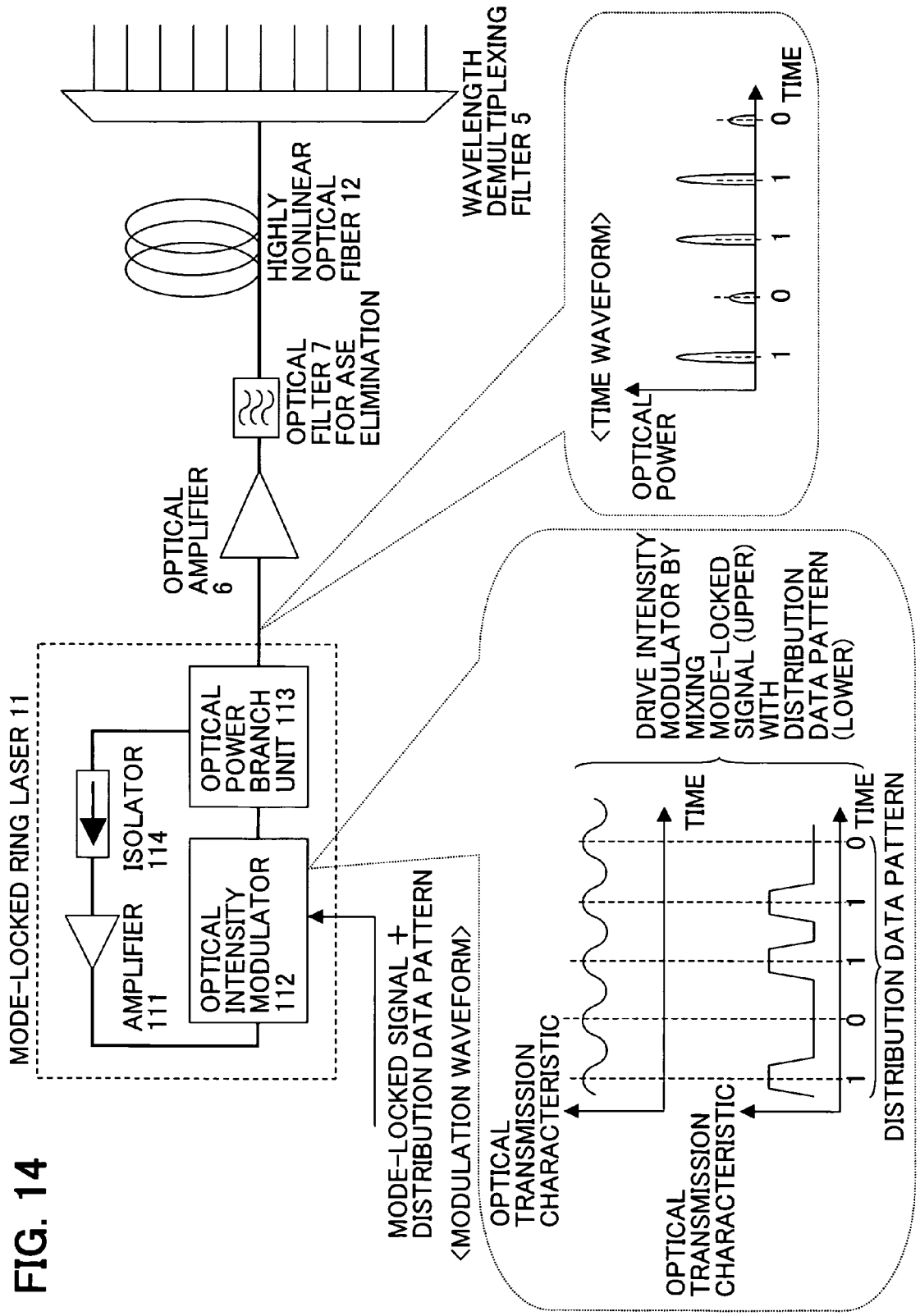

OPTICAL TRANSMISSION APPARATUS

CROSS-REFERENCE TO RELATED APPLICATIONS

This application is based upon and claims the benefit of priority from the prior Japanese Patent Application No. 2006-85226, filed on Mar. 27, 2006, the entire contents of which are incorporated herein by reference.

BACKGROUND OF THE INVENTION

1. Field of the Invention

The present invention relates to an optical transmission apparatus for transmitting a wavelength-multiplexed optical signal in an optical fiber network, and more particularly an optical transmission apparatus for broadcasting a distribution data by means of a wavelength-multiplexed optical signal.

2. Description of the Related Art

With the progress of broadband in communication infrastructures, communication and broadcasting are merging in recent years. The communication to date has mainly been based on point-to-point transmission in which stations are connected one-to-one. In contrast, 1-to-N broadcast, in which identical signals (distribution data) are distributed toward a plurality of routes, is required in broadcasting.

At present, a backbone communication network is configured of a large-capacity optical fiber transmission system. FIG. 1 to 3 show conventional configuration examples of an optical transmission apparatus for broadcasting the distribution data over such the large-capacity optical fiber transmission system.

For example, according to the configuration shown in FIG. 1, an optical intensity modulator 2 performs optical intensity modulation of the light supplied from a single-wavelength light source 1, which is constituted of a laser diode (LD) oscillating with a certain wavelength ($\lambda1$), with the distribution data, and the modulated light is distributed by a star coupler 3 for splitting the optical power of the light in 1-to-N. However, in the backbone optical communication network in recent years, wavelength division multiplexing (WDM) has been introduced to obtain a large capacity, and signal routes are switched according to the wavelengths. In order to perform broadcasting in such a network, it is necessary to carry identical distribution data on a plurality of wavelengths.

As a means for realizing the above method, as depicted in the configurations shown in FIGS. 2A, 2B, there is a known system (FIG. 2A) in which a plurality of single-wavelength light sources 1 oscillating with different wavelengths are prepared, and the light having each wavelength is multiplexed in an optical wavelength multiplexer 4, and then an optical intensity modulator 2 integrally modulates the wavelength-multiplexed light with identical distribution data, and the integrally modulated wavelength-multiplexed light is split in an optical wavelength demultiplexer 5. Also, as another known system (FIG. 2B), optical intensity modulators 2 are provided on a basis of light having different wavelengths, and the identical distribution data are modulated in each optical intensity modulator 2. However, in a present WDM network, wavelength multiplexing of several tens to several hundreds of wavelengths is performed, and therefore a huge cost may be required if an individual light source is to be prepared for each wavelength.

Meanwhile, to cope with such the anxiety, a multi-wavelength light source capable of outputting a plurality of wavelengths using a single light source is under study. In the official gazette of the Japanese Unexamined Patent Publication Nos. Hei-8-234250, Hei-9-244076, 2003-18126, 2003-69502, and 2001-264830, the inventions with respect to a variety of multi-wavelength light sources are disclosed. Among others, as a light source for WDM, a variety of studies have been conducted on a super continuum (SC) light source capable of generating coherent light through a wide wavelength band. The SC light source is a wideband light source utilizing the phenomenon that the spectrum is extremely spread by passing short pulse light (for example, having a pulse width of the order of picoseconds) of high energy (for example, a few watts at a peak value) through a special fiber (nonlinear medium).

FIG. 3 shows an exemplary configuration of an optical transmission apparatus using an SC light source 10. Also, FIGS. 4A-4C show diagrams illustrating characteristics of the light generated from SC light source 10 on a wavelength axis and a time axis, respectively, according to the configuration shown in FIG. 3. In FIG. 3, SC light source 10 includes a short pulse light source 11 and a nonlinear medium 12, and output light (string of repeated pulses) from short pulse light source 11 is made incident to nonlinear medium 12. As shown in FIG. 4A, the output light from short pulse light source 11 is a string of repeated pulses when viewed from the time axis, while the output light has a narrow spectrum deviating out of the wavelength transmission range of an optical wavelength demultiplexer 5, when viewed from the wavelength axis.

As shown in FIG. 4B, when the light output from short pulse light source 11 is incident to nonlinear medium 12, the spectrum of the output light is widely spread on the wavelength axis, including the wavelength transmission range of optical wavelength demultiplexer 5, due to nonlinear phenomena (self-phase modulation, four wave mixing and stimulated Raman scattering) and wavelength dispersion. Also, on the time axis, the pulse width is compressed, and the power is increased for the amount of compression. The light having a spread spectrum shown in FIG. 4B is called SC light. At this time, since the nonlinear phenomena appear more remarkably as the power incident to nonlinear medium 12 increases, the higher the peak power of the incident pulse light is, the more remarkable the spectral spread becomes. On the contrary, when the power is low, the spectral spread is suppressed.

Next, the SC light output from the nonlinear medium 12 is made incident to optical wavelength demultiplexer 5, and cut out on a wavelength component basis by means of a filter. Thereafter, light of each wavelength is modulated in optical intensity modulator 2, and WDM transmission is performed by carrying signals on each wavelength. As shown in FIG. 4C, the light output from optical intensity modulator 2 is intensity-modulated to the light having a predetermined wavelength transmitted through optical wavelength demultiplexer 5. Let optical power at the time of data '0' be Poff, and optical power at the time of data '1' be Pon, Pon/Poff is called an extinction ratio.

Generally, as short pulse light source 11, a mode-locked laser is employed so as to obtain a multi-longitudinal-modes component having good coherence, and as nonlinear medium 12, an optical fiber in which a wavelength dispersion value and a nonlinear coefficient are managed to efficiently generate the nonlinear phenomena. In the WDM transmission of backbone systems today, wavelength (signal) bandwidths of the C-band zone (1,530 nm-1,565 nm) and the L-band zone (1,565 nm-1,625 nm) are often used. To such the above bandwidths, it has been reported that SC light source 10 produces a satisfactory continuous spectrum over 1,450 nm-1,650 nm.

Additionally, in the official gazette of the Japanese Unexamined Patent Publication No. Hei-7-312575, there is disclosed a configuration for the transmission of a main signal superimposed with a sub-signal by use of an intermediate repeater in an optical communication system.

When configuring an optical transmission apparatus for broadcast using such the above SC light source 10, there is a known configuration as shown in FIG. 5. FIG. 5 shows a diagram illustrating an example of the conventional configuration of the optical transmission apparatus for broadcast using SC light source 10. FIG. 6 shows a diagram illustrating a characteristic of SC light source 10 on both the wavelength axis and the time axis, in the configuration shown in FIG. 5.

In FIG. 5, in order to integrally generate identical distribution data having multi-wavelength components, the SC light output from nonlinear medium 12 is intensity-modulated with the distribution data in optical intensity modulator 2, and thereafter, by demultiplexing the intensity-modulated SC light into each wavelength component in optical wavelength demultiplexer 5, the identical distribution data are output from each wavelength port of optical wavelength demultiplexer 5. FIG. 6A shows a characteristic of the light output from short pulse light source 11, FIG. 6B shows a characteristic of the light output from nonlinear medium 12, and FIG. 6C shows a characteristic of the light output from optical intensity modulator 2. Since the identical distribution data are carried on the light having each wavelength, before demultiplexing to each wavelength in optical wavelength demultiplexer 5, it is possible to integrally modulate with the identical distribution data for the entire wavelength bandwidths having been multiplexed.

However, in the conventional configuration shown in FIG. 5, there have been problems described below:

(1) Because the SC light is generated with spreading the spectrum by the pulse compression, the peak power of the pulse increases. For example, the peak power reaches as high as approximately +32 dBm. Considering the maximum tolerance of input light power of optical intensity modulator 2 generally in use, it is difficult to input such the high power pulse without modification. In a LN ($LiNO_2$) optical intensity modulator usually in use, the input upper limit is as high as approximately +20 dBm or of that order. Therefore, it is necessary to decrease the input value in advance using an attenuator so as to avoid break of optical intensity modulator 2. As a result, a wideband optical amplifier is additionally required for the purpose of level compensation.

(2) Because the SC light has a wide spectral width, wavelength dependency of a variety of characteristics of optical intensity modulator 2 (such as a transmission loss and an extinction ratio) becomes a great problem. For example, when the transmission loss characteristic is not uniform (flat) throughout the spectral range of the SC light, the optical power on each wavelength port after being split by optical wavelength demultiplexer 5 is also not uniform. As a result, level adjustment on a wavelength (channel) basis becomes separately necessary.

(3). When the SC light is integrally modulated, it is also necessary to pay attention to an influence of wavelength dispersion. FIGS. 7A-7C show diagrams illustrating the wavelength dispersion. The SC light is generated by making output light (pulse width: $\Delta t$, and pulse repetition period: T), supplied from short pulse light source 11 shown in FIG. 7A, be incident to nonlinear medium 12. At this time, when the wavelength dispersion of nonlinear medium 12, an optical fiber, is completely zero (refer to FIG. 7B), a group delay difference in a pulse is not generated even the spectrum becomes spread by means of the SC light. Therefore, each wavelength component can be intensity-modulated in optical intensity modulator 2 at the identical temporal timing.

On the other hand, when the wavelength dispersion is existent (refer to FIG. 7C), the group delay difference occurs in the wavelength band of the SC light. As a result, time deviation arises between the wavelength components before the SC light is input into optical intensity modulator 2. By performing integral intensity modulation, there is produced a wavelength range in which the modulation cannot be performed correctly in optical intensity modulator 2. When the pulse bitrate becomes particularly higher (or the repetition time T becomes shorter), it is necessary to pay attention to the above problem. For example, when a single-mode dispersion-shifted fiber (DSF) having a length of 3 km is used as nonlinear medium 12, considering the dispersion coefficient of a general DSF fiber, a delay difference of approximately 180 ps/km is produced between a zero-dispersion wavelength 1,550 nm and the longest wavelength of 1,625 nm in the L-band, and a delay time of approximately 540 ps arises in case of 3 km. Assuming a case of a bitrate of 10 Gbps, since the repetition time T=100 ps, the delay longer than the repetition time occurs, and integrated modulation becomes impossible.

(4) In the configuration shown in FIG. 5, the pulse extinction ratio (Pon/Poff) is determined by the characteristic of optical intensity modulator 2. Generally, optical intensity modulator 2 cannot completely intercept the light from passing through. Since the SC light has a high peak level of the pulse power, even when the optical power is Poff (in case of data '0'), high optical power may pass through as residual light, if the extinction ratio is small.

SUMMARY OF THE INVENTION

Accordingly, it is an object of the present invention to solve the aforementioned problem and provide an optical transmission apparatus realizing broadcast by means of WDM transmission using SC light.

In order to achieve the above-mentioned object, as a first configuration of an optical transmission apparatus according to an embodiment of the present invention, the optical transmission apparatus includes: a light source outputting either pulse light or continuous light; an intensity modulator having the light from the light source incident thereto, and outputting pulse light intensity-modulated with the light output from the light source according to a predetermined bit string pattern; a nonlinear medium having the pulse light from the intensity modulator incident thereto, bringing about nonlinear phenomena upon the pulse light supplied from the intensity modulator, and spreading the spectral width of the modulated pulse light having peak intensity of a predetermined level or higher to a predetermined spectral region; and an optical wavelength demultiplexer having the pulse light from the nonlinear medium incident thereto, and demultiplexing the pulse light having a wavelength component in the predetermined spectral region into light having a plurality of wavelengths, so as to output.

As a second configuration of the optical transmission apparatus according to the embodiment of the present invention, in the above first configuration, when the pulse light corresponding to a bit value '0' is made incident to the nonlinear medium, the intensity modulator performs intensity modulation of the pulse light corresponding to the bit value '0' so that the spectral width of the above pulse light is not spread to the predetermined spectral region due to the nonlinear phenomena, whereas when the pulse light corresponding to a bit value '1' is made incident to the nonlinear medium, the intensity modulator performs intensity modulation of the pulse light corresponding to the bit value '1' so that the spectral width of the above pulse light is spread to the predetermined spectral region due to the nonlinear phenomena.

As a third configuration of the optical transmission apparatus according to the embodiment of the present invention, in the above first configuration, the light source is a mode-locked laser generating a short pulse.

As a fourth configuration of the optical transmission apparatus according to the embodiment of the present invention, in the above first configuration, the light source is a direct-current light emitting laser generating continuous light.

As a fifth configuration of the optical transmission apparatus according to the embodiment of the present invention, in the above first configuration, the light source is a mode-locked laser generating a short pulse, and the intensity modulator is used in common with an intensity modulator for mode locking being incorporated in the mode-locked laser, and a signal having the bit string pattern superposed on a periodic signal for mode locking is supplied to the intensity modulator for mode locking.

As a sixth configuration of the optical transmission apparatus according to the embodiment of the present invention, in the above first configuration, the optical transmission apparatus further includes an optical amplifier amplifying the pulse light from the intensity modulator, and further, the pulse light from the intensity modulator is amplified in the optical amplifier, and incident to the nonlinear medium.

According to the present invention, short pulse light is intensity-modulated with a bit string pattern (distribution data) before being incident to a nonlinear medium. Accordingly, it is possible to generate a plurality of optical wavelength components integrally modulated with the identical distribution data, and an optical transmission apparatus for broadcast by means of WDM transmission can be realized.

Further scopes and features of the present invention will become more apparent by the following description of the embodiments with the accompanied drawings.

BRIEF DESCRIPTION OF THE DRAWINGS

FIGS. 7A-7C show diagrams explaining wavelength dispersion.

FIG. 14 shows a diagram illustrating a third configuration example of an optical transmission apparatus according to an embodiment of the present invention.

DETAILED DESCRIPTION OF THE PREFERRED EMBODIMENTS

The preferred embodiment of the present invention is described hereinafter referring to the charts and drawings. However, it is noted that the technical scope of the present invention is not limited to the embodiments described below.

Figure 8A:
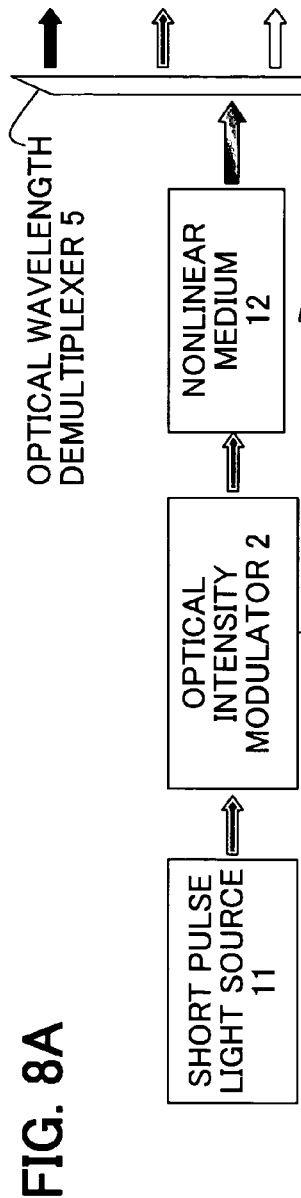
FIGS. 8A, 8B show diagrams explaining the principle of an optical transmission apparatus according to an embodiment of the present invention.
Figure 8B:
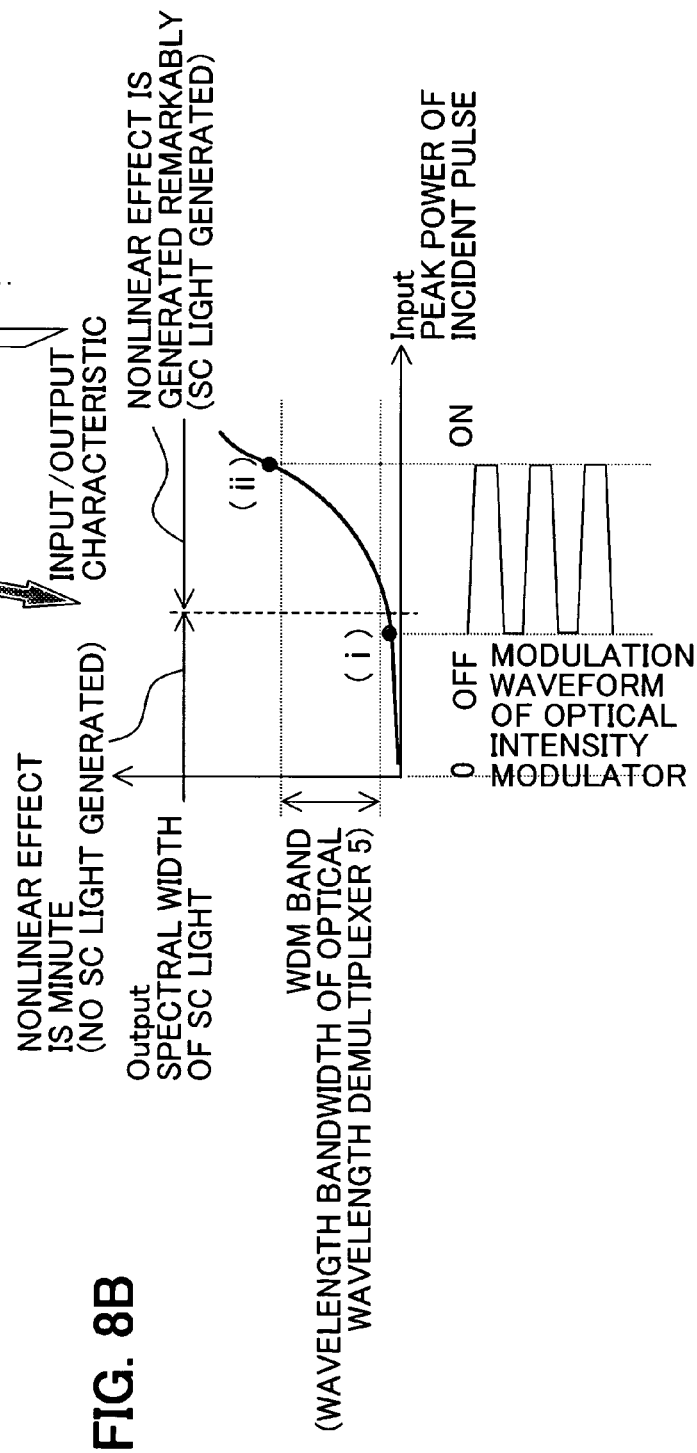

FIGS. 8A, 8B show diagrams explaining the principle of an optical transmission apparatus according to the embodiment of the present invention. In the prior art, light output from a short pulse light source 11 is made incident to a nonlinear medium 12, and then supercontinuum (SC) light output from nonlinear medium 12 is modulated in optical intensity modulator 2. In contrast, in the optical transmission apparatus according to the present invention, light output from short pulse light source 11 is modulated in optical intensity modulator 2, and thereafter, the light output from optical intensity modulator 2 is made incident to nonlinear medium 12, so as to generate SC light, as shown in FIG. 8A.

Namely, before making the light output from short pulse light source 11 incident to nonlinear medium 12, intensity modulation with a bit string pattern (distribution data) is performed, and thereafter the modulated light is made incident to the nonlinear medium. The pulse light corresponding to a bit value '0' is intensity-modulated so that the spectral width thereof is not spread to a WDM signal band due to the nonlinear phenomena when being incident to the nonlinear medium, thereby producing a state of no light output from optical wavelength demultiplexer 5. Meanwhile, the pulse light corresponding to a bit value '1' is intensity-modulated so that the spectral width thereof is spread to the WDM signal band due to the nonlinear phenomena when being incident to the nonlinear medium, thereby producing a state of light being output from optical wavelength demultiplexer 5.

FIG. 8B shows a diagram illustrating the relationship of the peak power of the pulse light (intensity-modulated light) being incident to nonlinear medium 12 to the spectral width of the SC light generated at that time. Due to the nonlinear effect of nonlinear medium 12, the spectral width of the incident light is spread. Here, as the peak power of the incident light is larger, the spread of the spectral width becomes larger (large nonlinear effect), whereas the spectrum is not spread largely when the peak power of the incident light is small (small nonlinear effect). As shown in FIG. 8B, when the light having power of a certain order is incident, the spectral spread occurs remarkably, finally reaching a range in which the spectral spread is saturated caused by a loss and dispersion. In the exemplary case of nonlinear medium 12 constituted of optical fiber, the typical numerical value of the spectral width is determined by such parameters as a dispersion coefficient and a fiber core diameter.

According to the present invention, using the aforementioned characteristic of nonlinear medium 12, when the distribution data is '1' (ON), pulse light of high peak power is incident to nonlinear medium 12 [a point (ii) shown in FIG. 8B], by which the spectral width is spread to a desired wavelength band (WDM band). Meanwhile, when the distribution data is '0' (OFF), the pulse light peak power is reduced to a predetermined level or less [a point (i) shown in FIG. 8B], by which the spread of the spectral width is suppressed so as not to spread to the WDM band.

Figure 9:
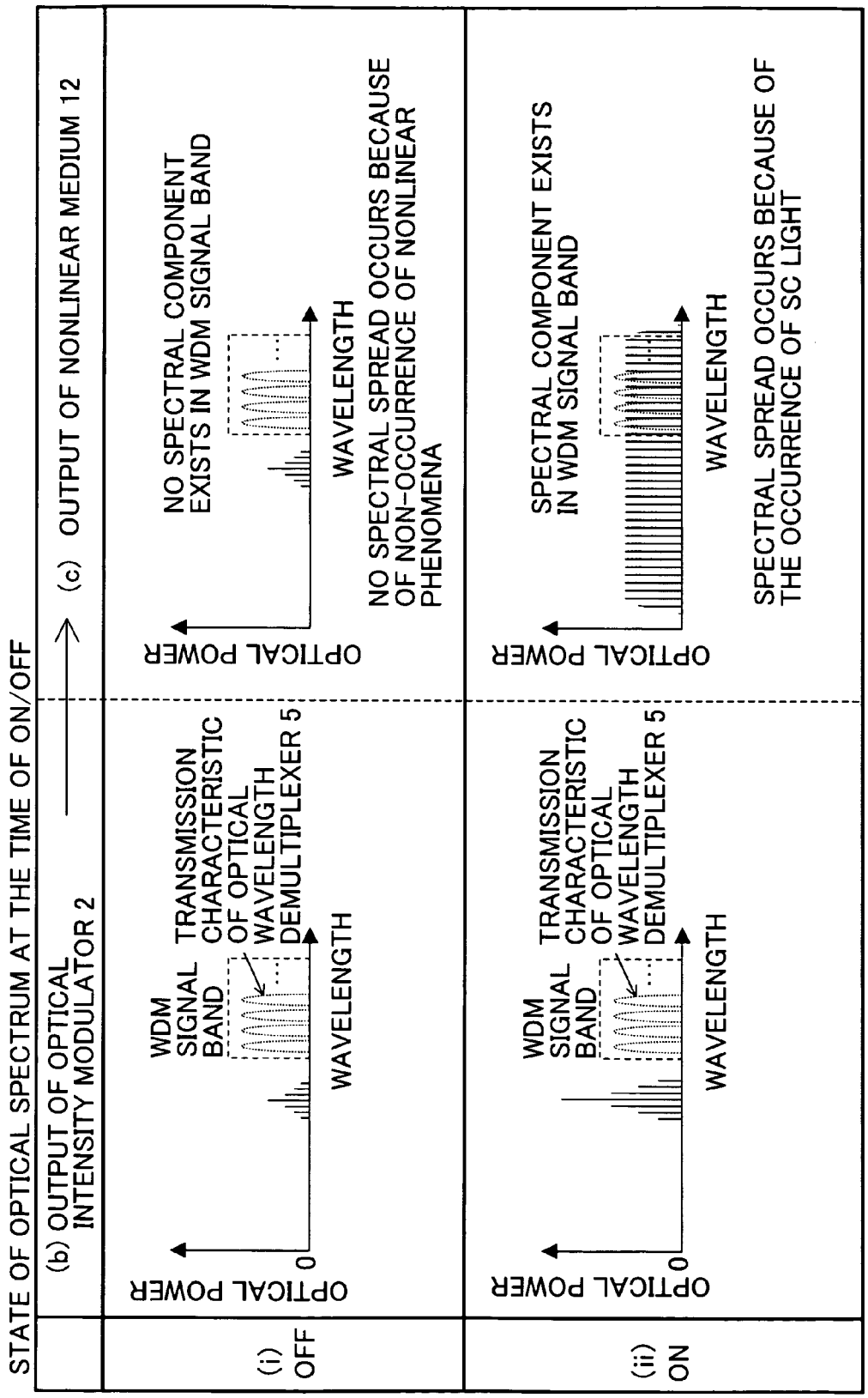
FIG. 9 shows a diagram illustrating the relationship of output light from optical intensity modulator 2 to output light from nonlinear medium 12.

FIG. 9 shows a diagram illustrating the relationship of the output light from optical intensity modulator 2 to the output light from nonlinear medium 12. To optical intensity modulator 2, pulse light having peak power of a certain level is incident from short pulse light source 11 at a certain period. The incident pulse light has a narrow spectral width within a wavelength region different from the WDM region. In case of the distribution data '0' (OFF), the incident pulse light is attenuated, and residual light having greatly reduced peak power is output from optical intensity modulator 2. Even if the residual light is made incident to nonlinear medium 12, the spectral width is not spread to the WDM region because the peak power of the incident light is not large enough to produce the nonlinear effect to the order of largely spreading the spectral width of the incident light. Accordingly, when demultiplexing the wavelength in the WDM region in optical wavelength demultiplexer 5, no light is output at all from each port of optical wavelength demultiplexer 5 in each WDM wavelength region (channel), because there is no spectral component of the incident light in the WDM region.

In contrast, in case of the distribution data '1' (ON), incident pulse light is not attenuated in optical intensity modulator 2. Therefore, the light having high peak power is output intact from optical intensity modulator 2, which is then incident to nonlinear medium 12. The above incident pulse light has peak power enough to produce a remarkable nonlinear effect, and the spectral width is spread to a region including the WDM region. Accordingly, when demultiplexing the light having a wavelength in the WDM region in optical wavelength demultiplexer 5, an optical signal of pulse light having a predetermined level is output from each port of optical wavelength demultiplexer 5 in each WDM wavelength region (channel), because the spectral component of the incident light exists in the WDM region.

Figure 10:
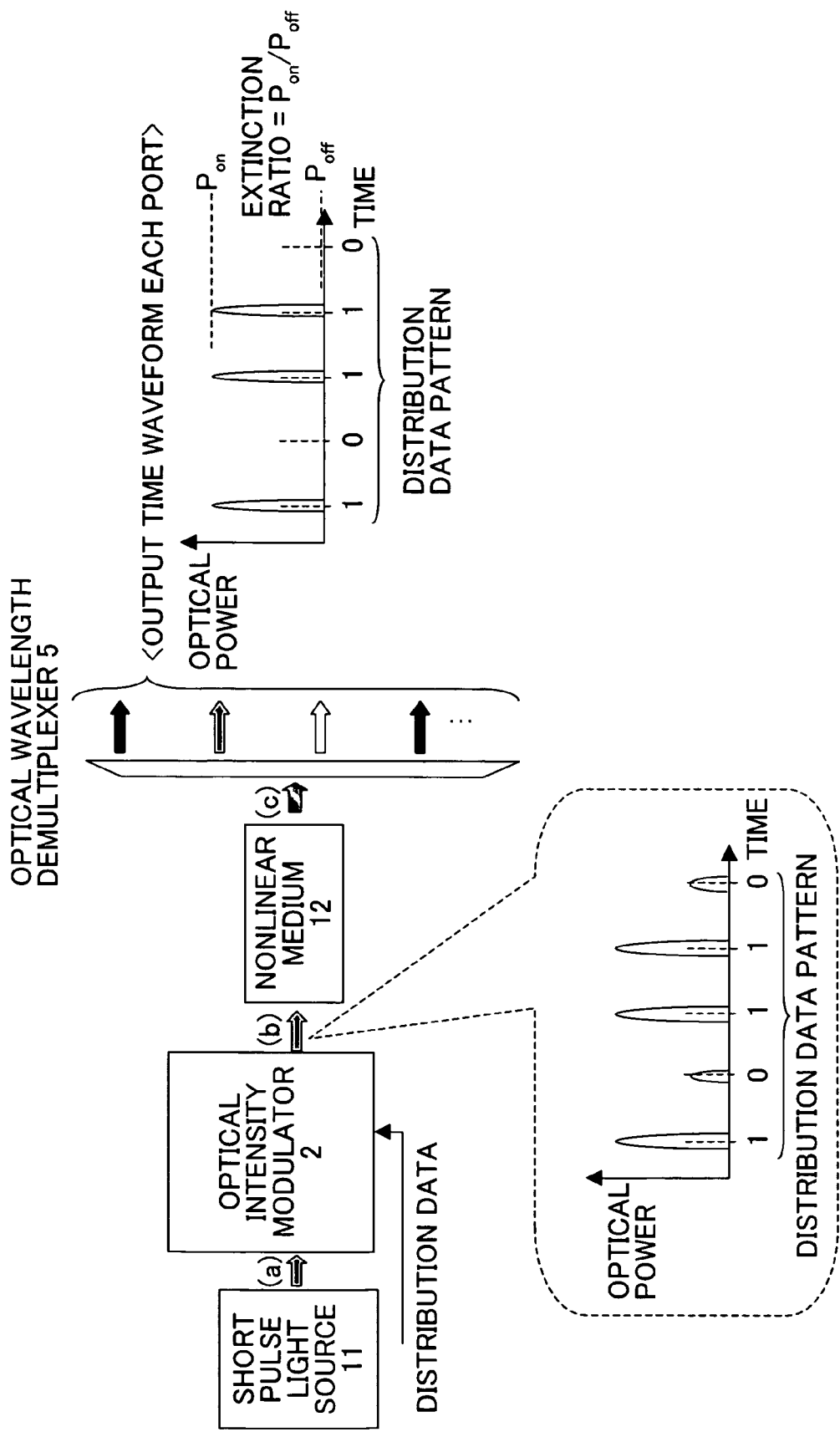
FIG. 10 shows a diagram illustrating the relationship of distribution data to output light from optical wavelength demultiplexer 5.

FIG. 10 shows a diagram illustrating the relationship of the distribution data to the output light from optical wavelength demultiplexer 5. In FIG. 10, when optical intensity modulator 2 intensity-modulates the pulse light supplied from short pulse light source 11 with a distribution data pattern, incase of the distribution data '0', the spectral light of the incident light is not spread to the WDM region, as described earlier. Thus, the output from each port of optical wavelength demultiplexer 5 is zero, namely no light is output at all, and the distribution data '0' can be output.

Meanwhile, in case of the distribution data '1', the spectral light of the incident light is greatly spread, so as to include the WDM region. Thus, the output from each port of optical wavelength demultiplexer 5 becomes a pulse signal having a predetermined level, and the distribution data '1' can be output accordingly.

Through the aforementioned principle of the optical transmission apparatus according to the present invention, the conventional problems can be solved. Namely;

(1) Because the pulse light incident to optical intensity modulator 2 has a waveform before pulse width compression due to the nonlinear effect, the peak power of the pulse light remains low as compared to the SC light. Accordingly, if the peak power of the pulse light supplied from short pulse light source 11 equals or is less than the upper limit of the light power incident to optical intensity modulator 2, the pulse light can be input intact to optical intensity modulator 2.

Also, when the peak power of the pulse light incident to nonlinear medium 12 is to be increased in order to spread the spectral width efficiently, it may be possible to modulate the pulse string having power below the upper limit of the input power of optical intensity modulator 2 once, and thereafter, amplify the modulated pulse string in an optical amplifier. In the prior art, an optical amplifier of which band is quite wide has been required for amplifying the SC light. In contrast, according to the present invention, since the spectral width of an optical pulse signal supplied from short pulse light source 11 is narrow, and is amplified in a stage of a narrow spectral width, it is possible to amplify using an optical amplifier of a narrow bandwidth.

(2) Because an optical signal is input and transmitted in optical intensity modulator 2 at a stage before spreading the spectral width (in other words, SC light having a wide spectral width is not transmitted in optical intensity modulator 2), restriction to a variety of wavelength dependent characteristics (such as transmission loss) becomes smaller, as compared to the case of integrally modulating the SC light.

(3) Because of the pulse light before spreading the spectral width, the bandwidth is sufficiently narrower than that of the SC light, and the pulse light is input to optical intensity modulator 2 immediately after the pulse light is generated, there is hardly produced a group delay difference in the pulse light due to wavelength dispersion. Thereafter, at a stage of generating the SC light, although the group delay due to the wavelength dispersion occurs, the conventional problem of being unable to integrally modulate the wavelengths in the WDM band due to the group delay difference between the wavelengths does not occur, because the modulation is already performed beforehand.

Figure 1:
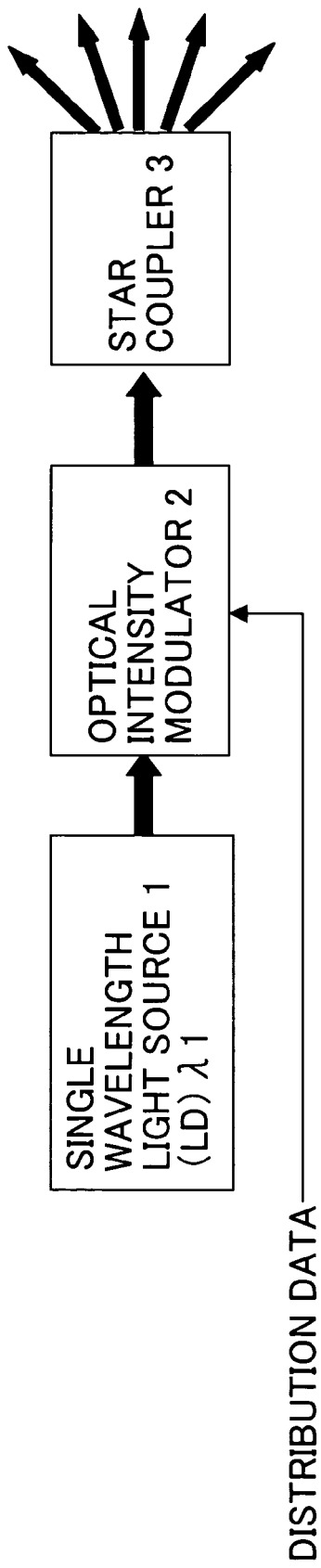
FIG. 1 shows an example of the conventional configuration of an optical transmission apparatus for performing data broadcast on a large-scale optical fiber transmission system.
Figure 2B:
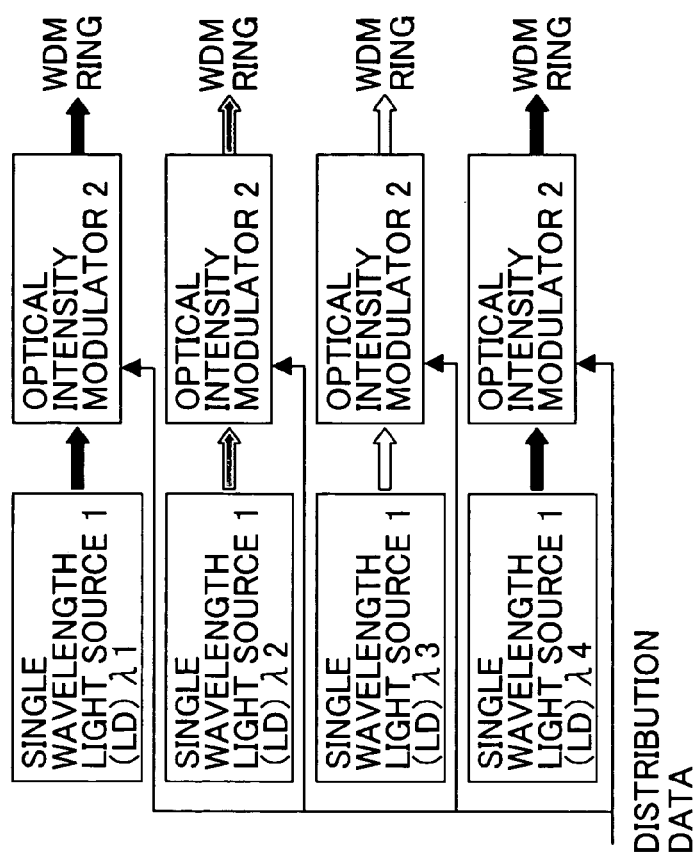
FIGS. 2A, 2B show examples of the conventional configurations of an optical transmission apparatus for performing data broadcast on a large-scale optical fiber transmission system.
Figure 2A:
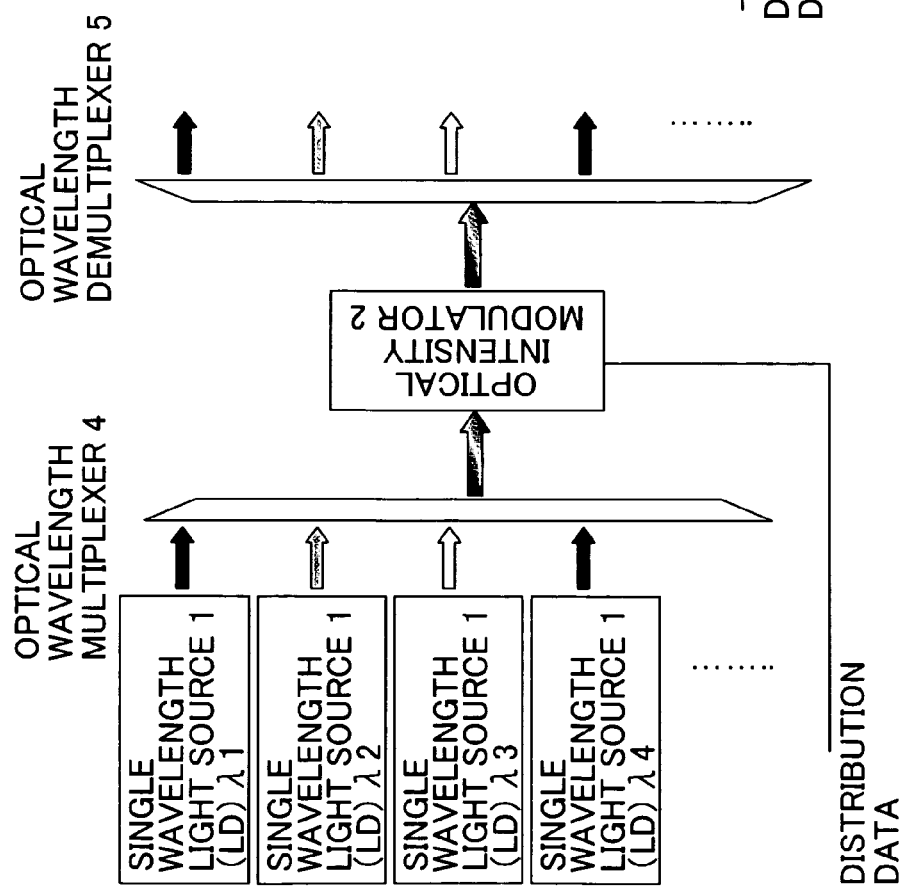
Figure 3:
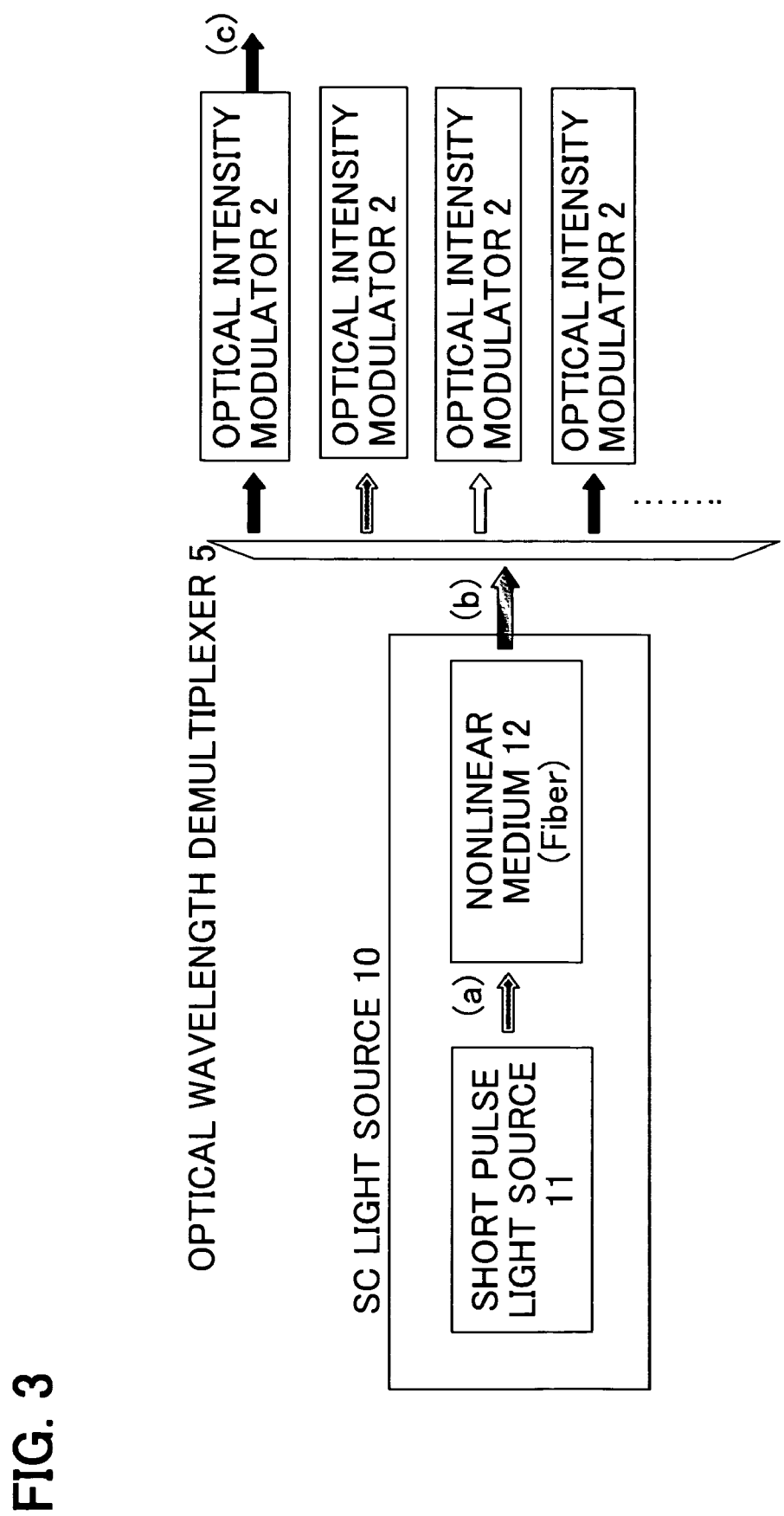
FIG. 3 shows an example of the conventional configuration of an optical transmission apparatus for performing data broadcast on a large-scale optical fiber transmission system.
Figures 4A, 4B, 4C:
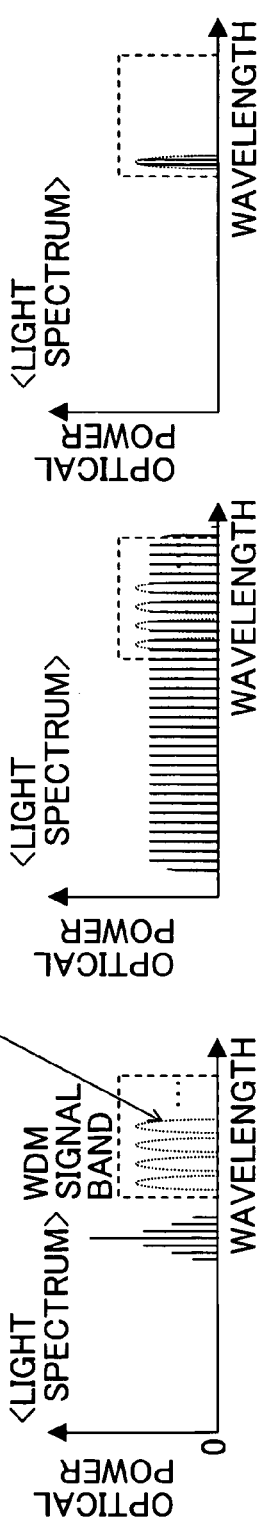
FIGS. 4A-4C show diagrams illustrating optical characteristic on a wavelength axis and a time axis supplied from SC light source 10 in the configuration shown in FIG. 3.
Figure 5:
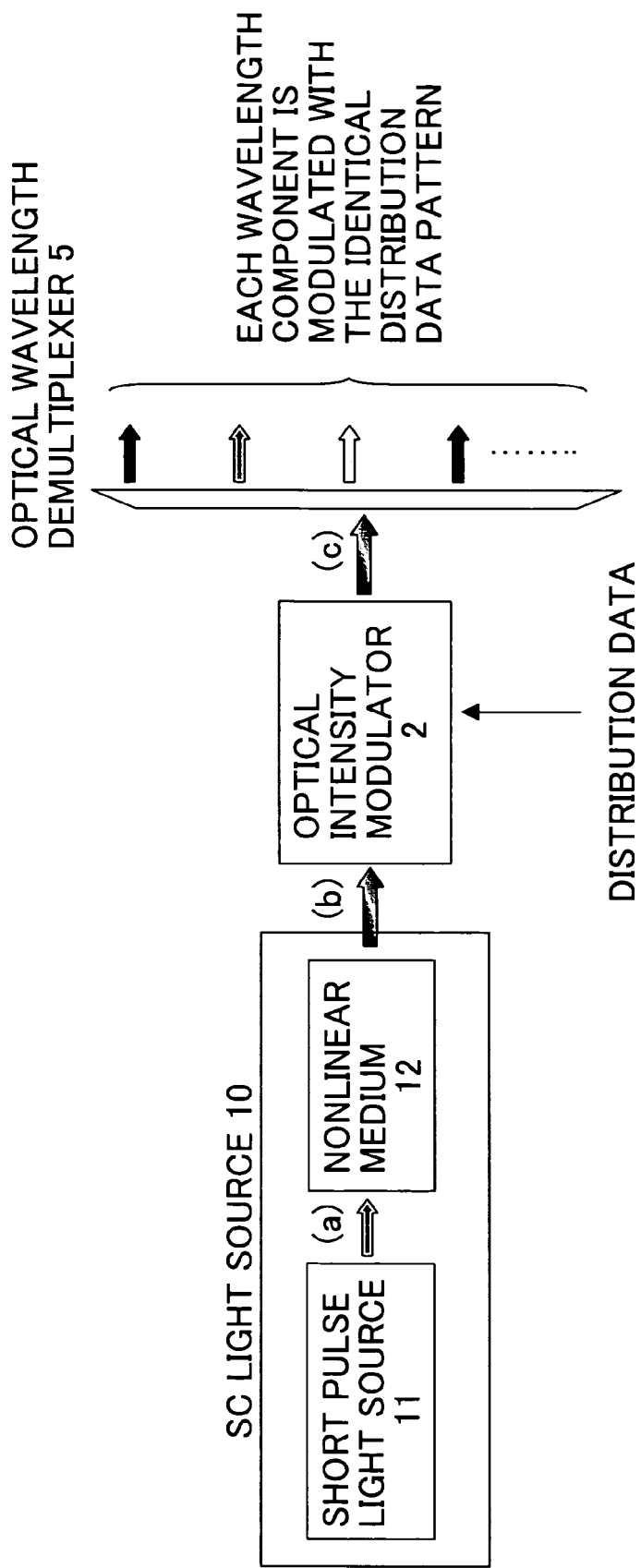
FIG. 5 shows a diagram illustrating an example of the conventional configuration of an optical transmission apparatus for broadcast using SC light source 10.
Figures 6A, 6B, 6C:
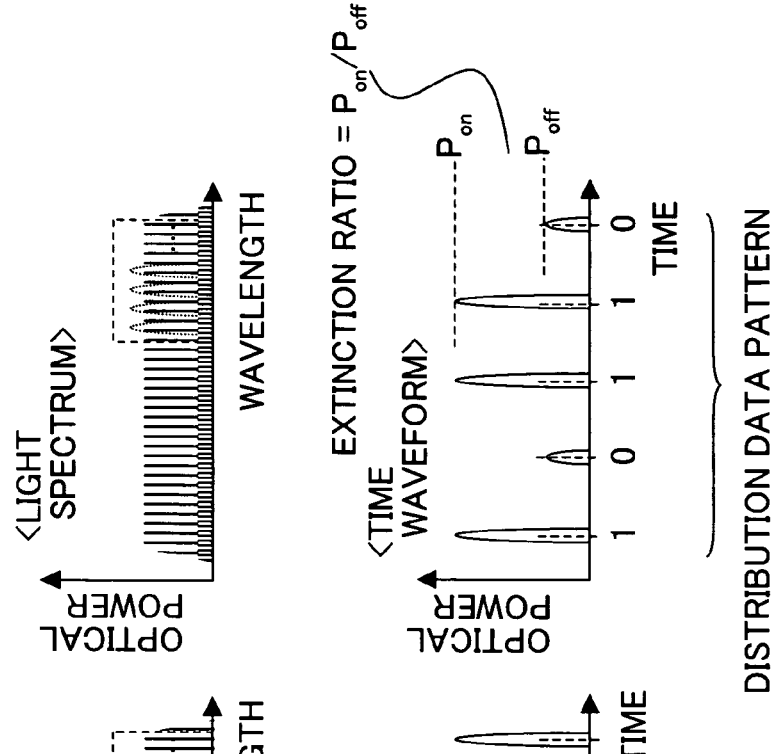
FIGS. 6A-6C show diagrams illustrating optical characteristics on a wavelength axis and a time axis supplied from SC light source 10 in the configuration shown in FIG. 5.

(4) In the configuration of the conventional optical transmission apparatus, the extinction ratio of the pulse light signal finally generated (the output from optical wavelength demultiplexer 5) is determined by the extinction ratio characteristic of the optical intensity modulator being used (refer to FIG. 6C). According to the present invention, because light is not output at all when the distribution data is '0' (OFF), and no light is existent, the extinction ratio is greatly improved. This is also effective to improve the extinction ratio of the optical intensity modulator, because the sufficient extinction ratio of the generated data pulse can be obtained depending on the parameter of the nonlinear medium, even in case of, for example, an optical intensity modulator having an insufficient extinction ratio.

Figure 11:
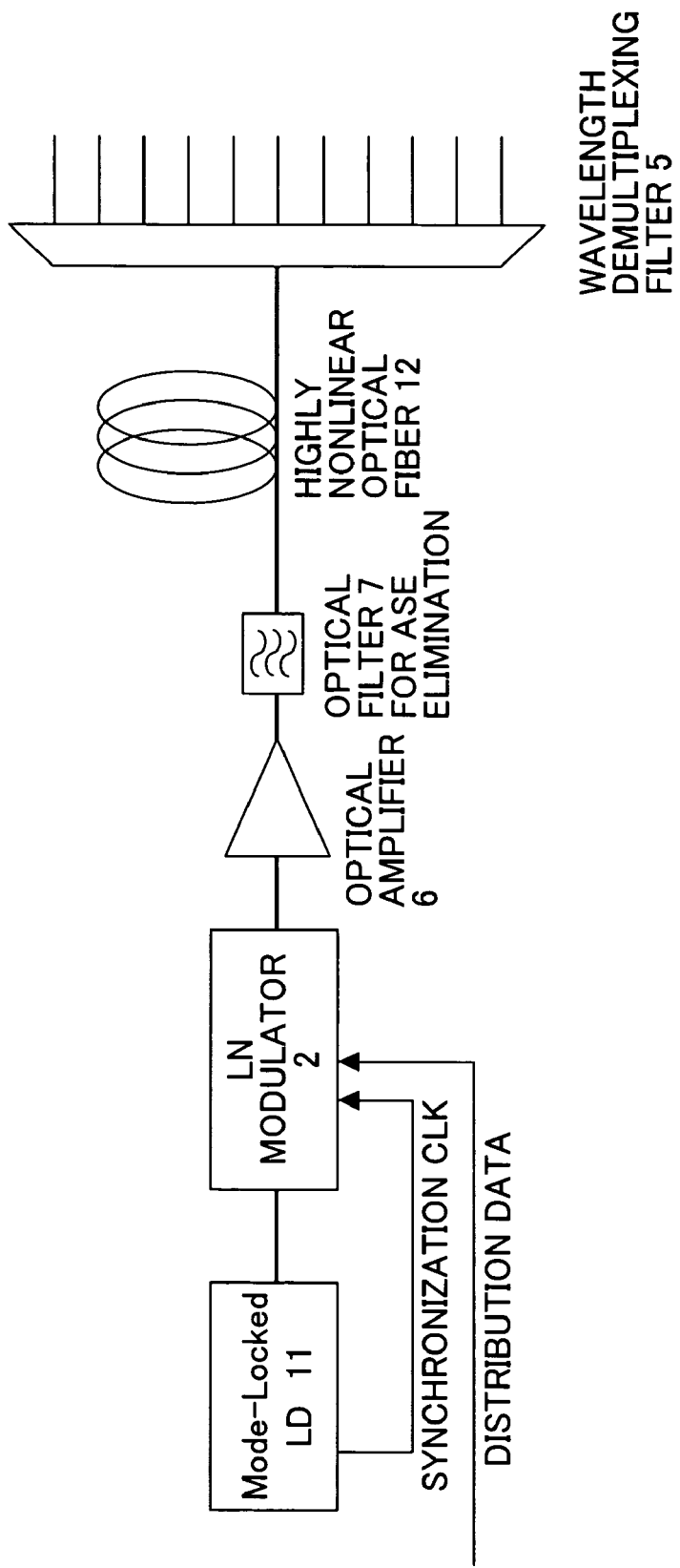
FIG. 11 shows a diagram illustrating a first configuration example of an optical transmission apparatus according to an embodiment of the present invention.

FIG. 11 shows a diagram illustrating a first configuration example of an optical transmission apparatus according to the embodiment of the present invention. As short pulse light source 11, a mode-locked laser diode (LD) generating repetitive short pulse light is used. As optical intensity modulator 2, an LN ($LiNO_2$) modulator generally used for intensity modulation is used. To spread the spectral width efficiently, an optical amplifier 6 for amplifying the output from LN modulator 2 is provided. Also, an optical filter 7 is disposed on the succeeding stage of optical amplifier 6 so as to eliminate extra noise light [for example, ASE (amplified spontaneous emission) light]. Optical amplifier 6 and optical fiber 7 are not necessary configuration elements. As nonlinear medium 12, a highly nonlinear dispersion management fiber is used, and as optical wavelength demultiplexer 5, an ordinary wavelength-demultiplexing filter is used.

To exemplify a typical value of each parameter, by citing a reference paper (Electron Letters, Vol. 3, No. 13, pp. 1064-1066 (1955), T. Morioka, et al.), calculation examples are shown below. Let a parameter indicating the degree of spread of the SC light spectrum be defined as Fb. The Fb represents a ratio of the spectral half width of the pulse light incident to nonlinear medium 12 to the spectral half width of the generated SC light. In the above reference paper, it is shown that Fb well fits to an empirical expression (approximate expression) shown in equation 1 below, when the nonlinear medium (optical fiber) 12 generating the SC light is short (for example, less than 1 km).

$$Fb = 1.49\sqrt{\{(\gamma P T^2)/|\beta_2|\}} - 0.75 \quad \text{(equation 1)}$$

Here, $\gamma$ is a nonlinear coefficient of the medium, P is peak power of the pulse, T is pulse width, and $\beta_2$ is group delay velocity (GDV) dispersion. According to the reference paper, the above approximate expression (equation 1) fits well when the value in { } of $\sqrt{}$ is from 16 to 1,000.

Figure 12:
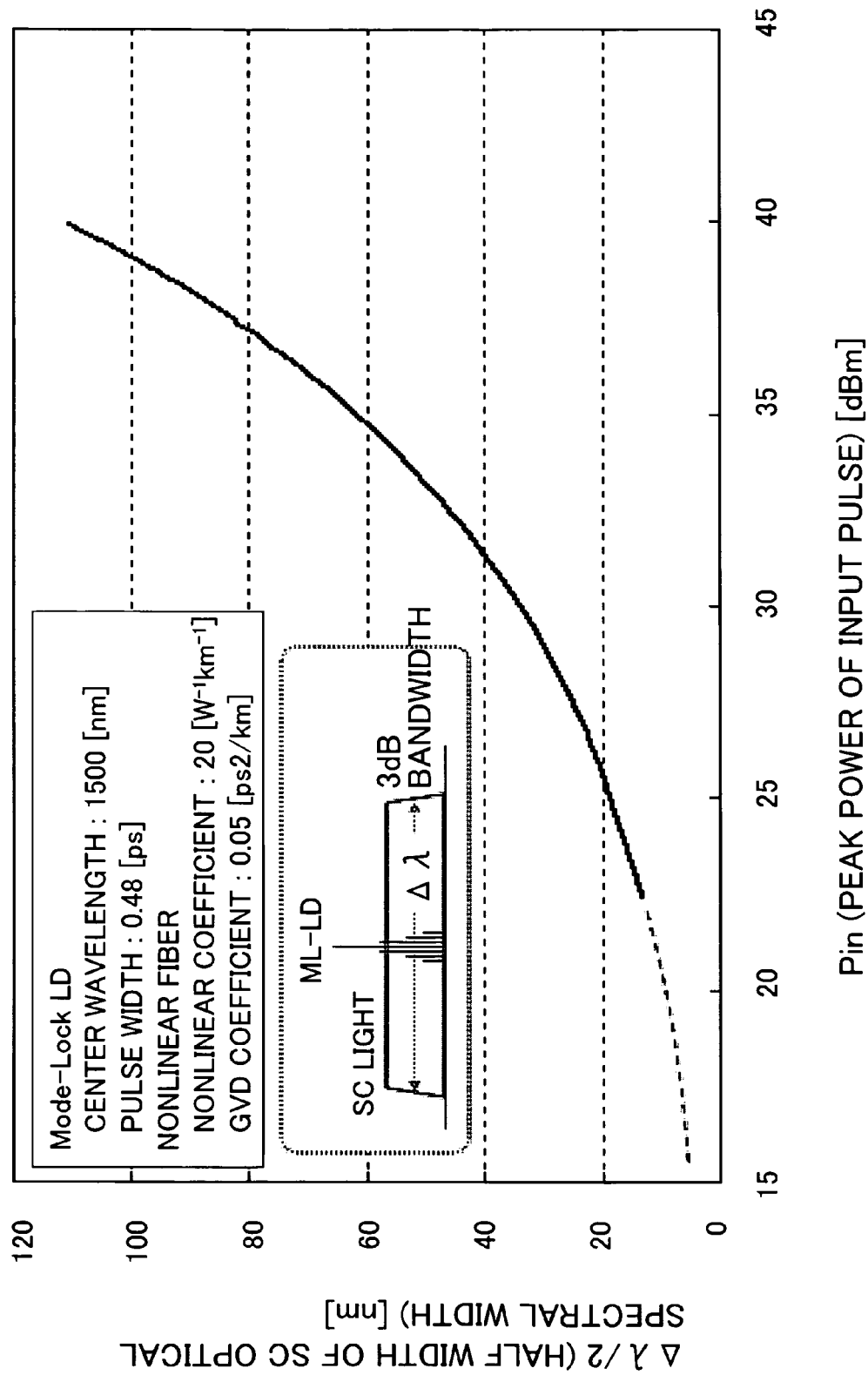
FIG. 12 shows a chart illustrating the relationship of the peak power of the pulse input to nonlinear medium 12 to a spectral half-value width of the generated SC light.

When appropriate realistic parameters fit to the above conditions are selected, a chart shown in FIG. 12 illustrates the relationship of the peak power of the pulse being input to nonlinear medium 12 to a spectral half-value width of the SC light generated at that time.

In FIG. 12, when the pulse peak power is between +22.5 dBm to +40 dBm, it is indicated that a half of the SC light spectral width of (the spectral width on either the longer wavelength side or the shorter wavelength side of the incident pulse) is spread to approximately 10 nm to 110 nm. Accordingly, when the above case is applied to the first configuration example shown in FIG. 11, by setting at +20 dBm at the time of OFF, and +40 dBm at the time of ON (the extinction ratio of LN modulator 2 is 20 dB) in the output of optical amplifier 6, there occurs the spectral spread of approximately up to 1,510 nm at the time of OFF, and approximately up to 1,610 nm at the time of ON. Thus, it becomes possible to obtain light source of an integrated modulation covering the C-band and the L-band of a general WDM band.

Figure 13:
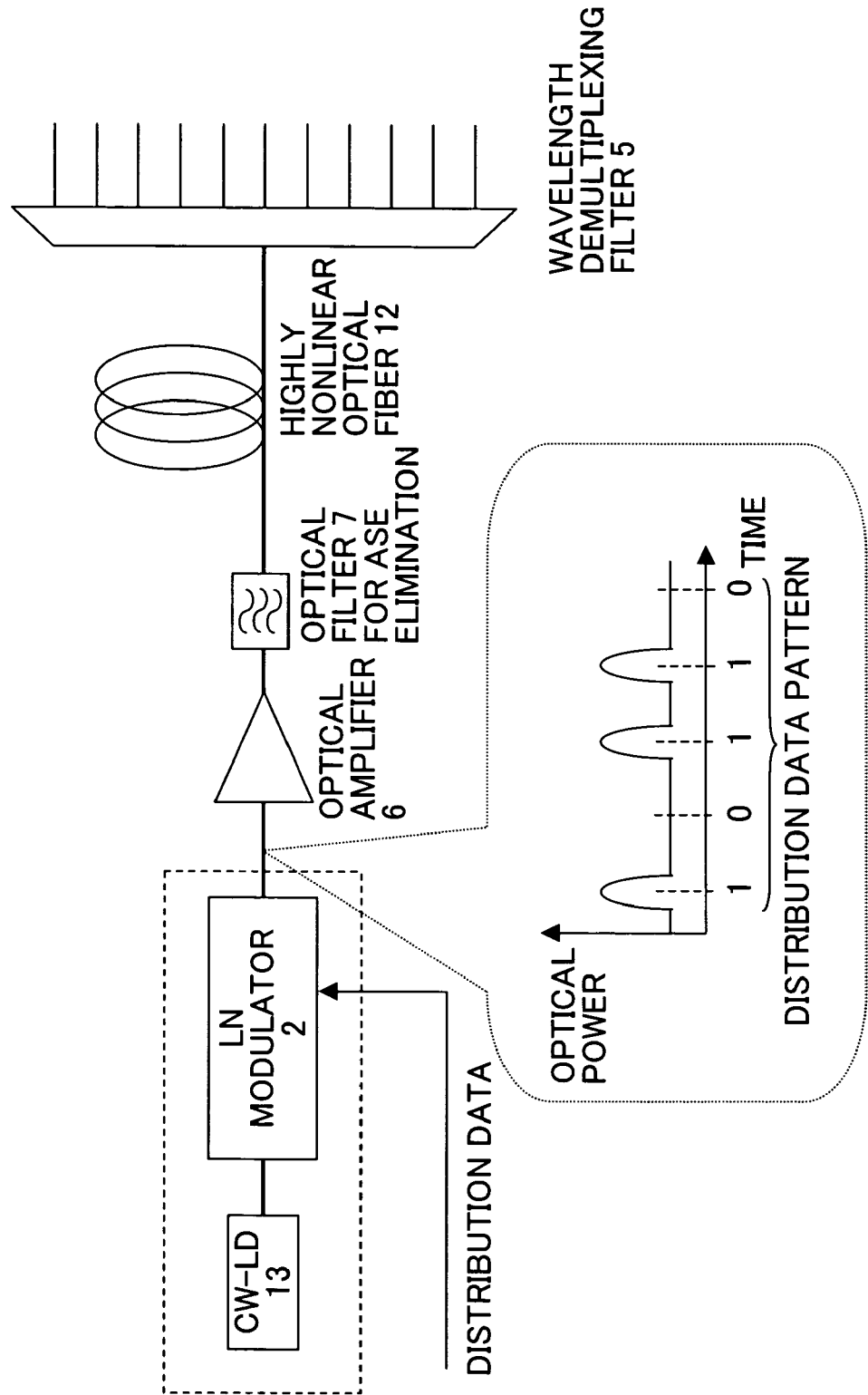
FIG. 13 shows a diagram illustrating a second configuration example of an optical transmission apparatus according to an embodiment of the present invention.

FIG. 13 shows a diagram illustrating a second configuration example of an optical transmission apparatus according to the embodiment of the present invention. In the first configuration example shown in FIG. 11, short pulse light source 11 (i.e. mode-locked LD) generating a repetitive short pulse string is used, so as to synchronize the short pulse period with the distribution data pattern. Meanwhile, in the second configuration example, for example, a light source 13 generating continuous light, such as direct-current light emitting laser diode (CW-LD) is used. The configuration elements other than the light source is similar to those used in the first configuration example shown in FIG. 11.

In optical intensity modulator 2, by intensity-modulating continuous light with the distribution data pattern, a modulated optical pulse signal can be output from optical intensity modulator 2, similarly to the case of the first configuration example. Namely, the combination of CW-LD 13 with LN modulator 2 constitutes a short pulse light source, in which LN modulator 2 functions as a means for generating pulse light, as well as performing intensity modulation with the distribute data pattern. Here, in general, the peak power of the continuous light from light source (CW-LD) 13 is low, as compared to the peak power of the pulse light from short pulse light source 11. Therefore, it is a premise that a pulse having sufficiently high peak power (sufficient to cause the nonlinear phenomena) can be generated by means of CW-LD 13 and optical amplifier 6.

FIG. 14 shows a diagram illustrating a third configuration example of an optical transmission apparatus according to the embodiment of the present invention. In the third configuration example, a mode-locked ring laser is used as short pulse light source 11. Also, as a modulation signal supplied to an optical intensity modulator 112 for mode locking constituting the mode-locked ring laser, there is supplied a modulation signal having the distribution data pattern superposed on a fundamental period signal for mode locking (mode-locking signal).

Short pulse light source 11 shown in FIG. 14 is the mode-locked ring laser. Seed light is amplified in an amplifier 111, and the amplified light transmits through optical intensity modulator 112 at the timing of a period of traveling once round the ring. An optical power branch unit 113 outputs a portion of pass-through light to the outside, while returning the remaining light to amplifier 111 via an isolator 114. With this, it becomes possible to generate the pulse light synchronized with the periodic mode-locking signal supplied to optical intensity modulator 112 for mode locking.

In the third configuration example, the distribution data pattern is superposed on the periodic mode-locking signal supplied to optical intensity modulator 112. In this case, it is a premise that the fundamental frequency of the ring coincides with the bitrate frequency of the distribution data. At this time, to optical intensity modulator 112 for mode locking disposed in the ring; (A) sine-wave modulation (mode-locking signal) is performed with the fundamental frequency of the ring so as to generate the mode locking; and, (B) two kinds of intensity modulator drive signals for intensity-modulating with the distribution data pattern are mixed and supplied. By this, it becomes possible to generate short pulse light by mode locking and modulate the short pulse light with the distribution data, simultaneously. Other configuration elements than the light source are similar to those in the first configuration example shown in FIG. 11.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. An optical transmission apparatus comprising:
    a light source outputting either pulse light or continuous light;
    an intensity modulator having the light output from the light source incident thereto, and performing intensity modulation to thereby output pulse light intensity-modulated according to a predetermined bit string pattern of data;
    a nonlinear medium having the pulse light output from the intensity modulator incident thereto, bringing about nonlinear phenomena upon the pulse light output from the intensity modulator and incident to the nonlinear medium, and thereby spreading spectral width of intensity-modulated pulse light having peak intensity of a predetermined level or higher to a predetermined spectral region, and thereby outputting a spectral width spread pulse light; and
    an optical wavelength demultiplexer having the spectral width spread pulse light output from the nonlinear medium incident thereto, and demultiplexing incident spectral width spread pulse light having a wavelength component in the predetermined spectral region into a plurality of wavelengths, wherein
    the intensity modulator performs intensity modulation corresponding to the bit value "0" so that the spectral width of the intensity-modulated pulse light is not spread to the predetermined spectral region due to the nonlinear phenomena, and the intensity modulator performs intensity modulation corresponding to the bit value "1" so that the spectral width of the intensity-modulated pulse light is spread to the predetermined spectral region due to the nonlinear phenomena.

2. The optical transmission apparatus according to claim 1, wherein, the light source is a mode-locked laser generating a short pulse.

3. The optical transmission apparatus according to claim 1, wherein, the light source is a direct-current light emitting laser generating continuous light.

4. The optical transmission apparatus according to claim 1, wherein, the light source is a mode-locked laser generating a short pulse, and the intensity modulator is used in common with an intensity modulator for mode locking being incorporated in the mode-locked laser, and a signal having the bit string pattern superposed on a periodic signal for mode locking is supplied to the intensity modulator for mode locking.

5. The optical transmission apparatus according to claim 1, further comprising:

an optical amplifier amplifying the pulse light output from the intensity modulator, wherein the pulse light output from the intensity modulator is amplified in the optical amplifier, and incident to the nonlinear medium.

6. An apparatus comprising:

a light source outputting light;

a modulator intensity modulating the light output from the light source with a bit string pattern of data;

a nonlinear medium bringing about nonlinear phenomena to thereby spread spectral width to a predetermined spectral region of pulses in the intensity modulated light having peak intensity of a predetermined level or higher; and a demultiplexer demultiplexing each spread spectral width pulse in the predetermined spectral region into a plurality of wavelengths, wherein the modulator intensity modulates light output from the light source with a bit value "0" of the bit string pattern so that the spectral width of the intensity-modulated light is not spread to the predetermined spectral region due to nonlinear phenomena brought about by the nonlinear medium, and the modulator intensity modulates light output from the light source with a bit value "1" of the bit string pattern so that the spectral width of the intensity-modulated light is spread to the predetermined spectral region due to the nonlinear phenomena brought about by the nonlinear medium.

7. An apparatus as in claim 6, wherein the predetermined spectral region is a wavelength division multiplex (WDM) signal band, the plurality of wavelengths are wavelengths for broadcasting data within the WDM signal band, and the data is represented by the bit stream pattern.

8. An apparatus comprising:

a light source outputting light;

means for intensity modulating the light output from the light source with a bit string pattern of data;

means for bringing about nonlinear phenomena to thereby spread spectral width to a predetermined spectral region of pulses in the intensity modulated light having peak intensity of a predetermined level or higher; and means for demultiplexing each spread spectral width pulse in the predetermined spectral region into a plurality of wavelengths, wherein the means for intensity modulating intensity modulates light output from the light source with a bit value "0" of the bit string pattern so that the spectral width of the intensity-modulated light is not spread to the predetermined spectral region due to nonlinear phenomena brought about by the means for bringing about nonlinear medium, and the means for modulating intensity modulates light output from the light source with a bit value "1" of the bit string pattern so that the spectral width of the intensity-modulated light is spread to the predetermined spectral region due to the nonlinear phenomena brought about by the means for bringing about nonlinear medium.

9. An apparatus as in claim 8, wherein the predetermined spectral region is a wavelength division multiplex (WDM) signal band, the plurality of wavelengths are wavelengths for broadcasting data within the WDM signal band, and the data is represented by the bit stream pattern.

* * * * *